(12) United States Patent
Arai et al.

(10) Patent No.: US 6,921,820 B2
(45) Date of Patent: Jul. 26, 2005

(54) METHOD FOR FORMING CELLULOSE

(75) Inventors: Kunio Arai, Sendai (JP); Tadafumi Ajiri, Sendai (JP); Hideo Hattori, Nisshin (JP); Mitsuru Sasaki, Sendai (JP)

(73) Assignees: Toyota Jidosha Kabushiki Kaisha, Toyota (JP); Genesis Research Institute, Inc., Nagoya (JP)

( * ) Notice: Subject to any disclaimer, the term of this patent is extended or adjusted under 35 U.S.C. 154(b) by 0 days.

(21) Appl. No.: 10/247,623

(22) Filed: Sep. 20, 2002

(65) Prior Publication Data

US 2003/0018187 A1 Jan. 23, 2003

Related U.S. Application Data

(63) Continuation of application No. PCT/UP01/05996, filed on Jul. 11, 2001.

(30) Foreign Application Priority Data

Jul. 11, 2000 (JP) ........................................ 2000-210537

(51) Int. Cl.$^7$ ............................. C08B 13/00; D21C 1/00
(52) U.S. Cl. ........................... 536/58; 536/102; 536/63; 536/76; 536/85; 536/124; 428/221; 106/206.1; 162/158; 162/68
(58) Field of Search ........................... 536/102, 58, 63, 536/76, 85, 124; 428/221; 106/206.1; 162/158, 68

(56) References Cited

U.S. PATENT DOCUMENTS

2001/0031861 A1 * 10/2001 Sato et al. .................... 536/58

FOREIGN PATENT DOCUMENTS

| EP | 0 872 536 A | 10/1998 |
|----|-------------|---------|
| FR | 1 194 486 A | 11/1959 |
| FR | 1 363 884 A | 6/1964 |
| JP | B2 3042076 | 3/2000 |
| WO | WO 99/35190 A | 7/1999 |

OTHER PUBLICATIONS

Sasaki et al. "Cellulose hydrolysis in subcritical and supercritical water". Journal of Supercrotical Fluids, 13, pp. 261–268, 1998.*

(Continued)

Primary Examiner—James O. Wilson
Assistant Examiner—Devesh Khare
(74) Attorney, Agent, or Firm—Oliff & Berridge, PLC (57) ABSTRACT

A method for forming II-type cellulose, which comprises introducing together a slurry having water and a I-type cellulose dispersed therein and water in the state of high temperature and high pressure to a tubular reactor (28) contacting the I-type cellulose with a hot water in a supercritical state or subcritical state for a predetermined time in the tubular reactor (28), to thereby cleave a part of hydrogen bonds in the I-type cellulose and dissolve the I-type cellulose into the water in a supercritical state or subcritical state, cooling a cellulose solution discharged from the tubular reactor (28) in a cooler (30) to room temperature or lower, followed by allowing to stand, to thereby precipitate crystals of II-type cellulose having a molecular weight lower than that of the I-type cellulose, and separating the resultant II-type cellulose from a solvent. The method allows the preparation of pure II-type cellulose by the use of a simple process.

8 Claims, 10 Drawing Sheets

OTHER PUBLICATIONS

Adschiri et al. J. Chem. Engg. Of Japan, 26, No. 6, pp. 676–680, 1993.*

Adschiri et al., "Noncatalytic Conversion of Cellulose in Supercritical and Subcritical Water", Journal of Chemical Engineering of Japan, vol. 26, No. 6, pp. 676–680, 1993.

Arai et al., "Importance of phase equilibria for understanding supercritical fluid environments", Fluid Phase Equilibria 158–160, pp. 673–684, 1999.

Sasaki et al., "Cellulose hydrolysis in subcritical and supercritical water", The Journal of Supercritical Fluids, pp. 261–268, 1998.

American Institute of Chemical Engineers, "Research & Development for Results: A Celebration of Innovation", AIChE's 1999 Annual Meeting Program Book, Nov. 1999.

Tomoaki Minowa et al., "Cellulose decomposition in hot-compressed water with alkali or nickel catalyst," Journal of Supercritical Fluids 13, 1998, pp. 253–259.

* cited by examiner

METHOD FOR FORMING CELLULOSE

This is a Continuation of International Application No. PCT/JP01/05996 filed Jul. 11, 2001. The entire disclosure of the prior application(s) is hereby incorporated by reference herein in its entirety.

BACKGROUND OF THE INVENTION

1. Field of the Invention

The present invention relates to a method for forming a type II cellulose. More specifically, it relates to a method for forming a type II cellulose employing water in a supercritical or subcritical state.

2. Description of the Related Art

Heretofore, it has been known that use of water in a supercritical or subcritical state can induce a variety of unique reactions. Japanese Patent No. 3042076 discloses the hydrolysis of cellulose using water in a supercritical or water in a subcritical state as a solvent, whereby the cellulose can be decomposed into an oligomer or glucose.

Figure 1:
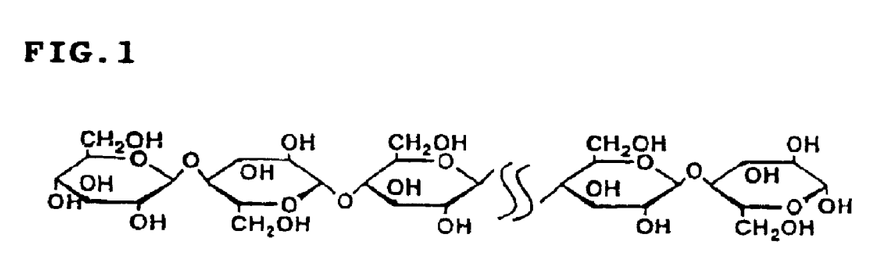
FIG. 1 is a diagram showing the structure of a cellulose.

A cellulose molecule has a structure as shown in FIG. 1 and is a homopolysaccharide formed by a β-(1,4) glycosidic linkage of β-D-glucose residues. In general, cellulose molecules form a strong crystal state by intramolecular hydrogen bonds or intermolecular hydrogen bonds with other cellulose molecules.

Figure 2:
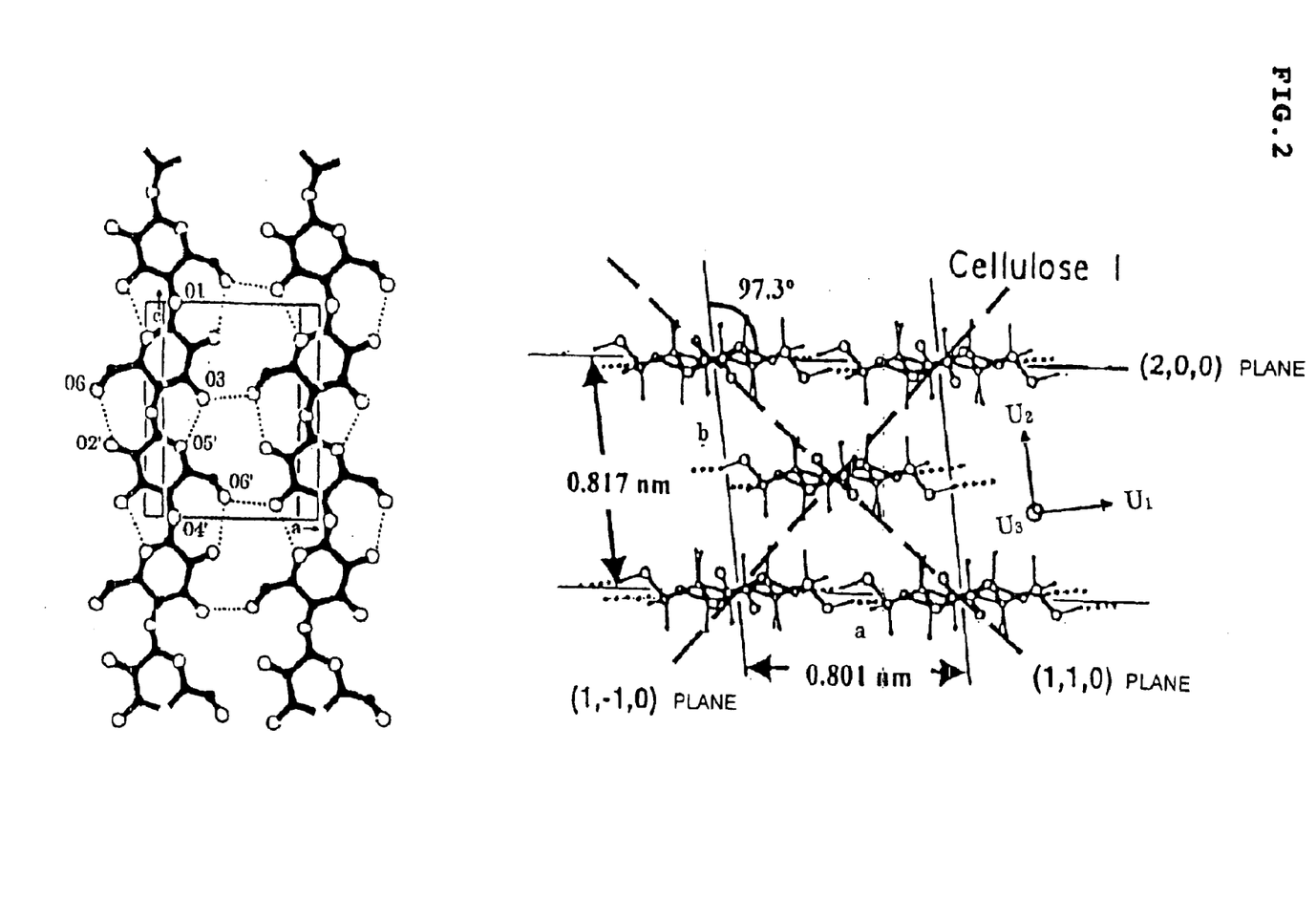
FIG. 2 is a diagram showing the structure of a type I cellulose.
Figure 3:
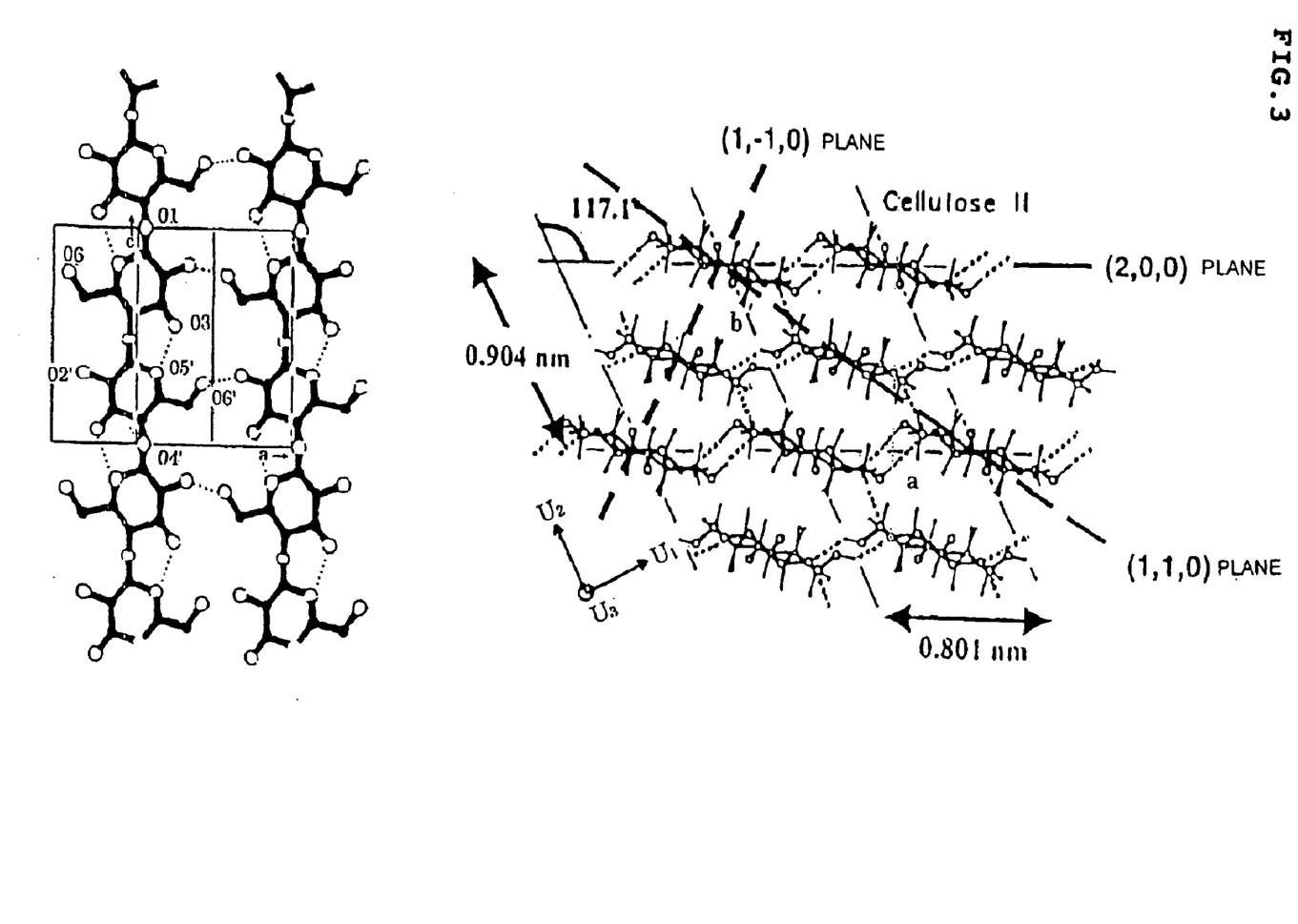
FIG. 3 is a diagram showing the structure of a type II cellulose.

The main crystal structures of celluloses are a type I cellulose and a type II cellulose, which are shown in FIG. 2 and FIG. 3, respectively. In FIGS. 2 and 3, the drawing on the left side shows an arrangement within a fiber plane, and the drawing on the right side shows an arrangement between fibers. As can be understood from these drawings, both the crystal structures of the type I and type II celluloses have a monoclinic system, and the arrangements of their molecules within a fiber plane ((2,0,0) plane) are about the same. However, the molecules of the type I cellulose between the fiber planes form a parallel arrangement, while the molecules of the type II cellulose between the fiber planes form an antiparallel arrangement. Therefore, they are different from each other.

Most celluloses existing in nature have the type I cellulose structure, and those having the type II cellulose structure exist on rarely in nature. The type II cellulose is produced by causing the cellulose to swell in a mixture of various organic solvents and then protonating the swollen cellulose, and thus the produced type II cellulose is partially utilized as synthetic fiber.

As described above, the type II cellulose is scarce in nature and is only produced by a specific process, and the thus produced type II cellulose is restrictively used. However, in actual fact, a variety of type II celluloses having a different degree of polymerization exist, and it is considered that the type II celluloses would be employed in a wider variety of fields if they could be easily produced. Particularly, conventional production methods comprise decomposition of the type I cellulose by use of a mixed organic solvent containing an acid or the like and has a problem that other chemical substances are mixed in and a procedure to eventually obtain the type II cellulose thereby becomes complicated.

SUMMARY OF THE INVENTION

The present invention has been conceived in view of the above problem. An object of the present invention is to provide a method of forming a pure type II cellulose through a simple process.

In the present specification, "cellulose" in the term "type II cellulose" includes low molecular weight oligomers.

A method of forming a cellulose according to the present invention comprises decomposing some of the hydrogen bonds in a type I cellulose using of water in a supercritical state or subcritical state as a solvent to dissolve the type I cellulose in the water in a supercritical state or subcritical state and then allowing the resulting solution to cool to room temperature or lower at atmospheric pressure to obtain a type II cellulose having a lower degree of polymerization than the type I cellulose.

As described above, in the present invention, the hydrogen bonds in the type I cellulose are decomposed using water in a supercritical state or subcritical state as a solvent to dissolve the type I cellulose in the water in a supercritical or subcritical state. Then, the resulting solution is allowed to cool to room temperature or lower at atmospheric pressure to obtain the type II cellulose. Therefore, the type I cellulose can be dissolved in water without using other chemical substances, and the type II cellulose having a different structure from that of the type I cellulose can be obtained. Consequently, a type II cellulose with high purity can be obtained through a simple process.

Further, according to another aspect of the present invention, a slurry having a type I cellulose dispersed therein and water at high temperatures and atmospheric pressure are charged into a tubular reactor simultaneously. The type I cellulose and the hot water in a supercritical state or subcritical state are allowed to contact each other for a predetermined length of time, thereby cleaving some of hydrogen bonds in the type I cellulose and dissolving the type I cellulose in the water in a supercritical state or subcritical state. Then, the resulting cellulose solution discharged from the tubular reactor is cooled to room temperature or lower at atmospheric pressure to deposit crystals of a type II cellulose having a lower degree of polymerization than the type I cellulose. Then, the obtained type II cellulose is separated from the solvent to obtain a pure type II cellulose.

Thus, when a type I cellulose and hot water in a supercritical or subcritical state are mixed in a tubular reactor, some of the hydrogen bonds in the type I cellulose are cleaved. Thereby, the cellulose is dissolved in the hot water. Hydrolysis of the cellulose partially begins while the cellulose is kept in this state for a predetermined length of time. When this solution is cooled to room temperature or lower at atmospheric pressure, a dissolved cellulose with a predetermined molecular weight is deposited. At this point, the cellulose is rearranged into a type II cellulose. Thereby, a type II cellulose can be obtained.

Further, in still another aspect of the present invention, a type I cellulose and water in a supercritical state or subcritical state are brought into contact with each other for a predetermined length of time, thereby cleaving some of hydrogen bonds in the type I cellulose and dissolving the type I cellulose in the water in a supercritical state or subcritical state. Then, the resulting solution is allowed to return to room temperature or lower at atmospheric pressure to obtain a type II cellulose having a lower degree of polymerization than the type I cellulose. Further, in the present embodiment, the time during which the type I cellulose and the hot water in a supercritical state or subcritical state are brought into contact with each other and a temperatures and pressures during the time are controlled so as to control a degree of polymerization and/or a relative crystallinity index of the formed type II cellulose.

Thus, when a time, i.e., a reaction time, during which the type I cellulose and hot water in a supercritical state or subcritical state are made to contact each other and temperatures and pressures during the reaction time are controlled, the degree of polymerization and/or relative crystallinity index of a formed type II cellulose can be controlled. Thus, a type II cellulose having a desired degree of polymerization and/or a desired relative crystallinity index can be obtained.

In addition, it is preferable that the type I cellulose be mixed with hot water in the supercritical state or subcritical state to quickly raise the temperature of the mixture, and that the mixture then be mixed with cold water to quickly lower the temperature of the mixture, thereby controlling the time during which the type I cellulose and the water in the supercritical state or subcritical state are brought into contact with each other. In consequence, the reaction time can be accurately determined, and the degree of polymerization and/or relative crystallinity index of a formed type II cellulose can also be accurately controlled.

BRIEF DESCRIPTION OF THE DRAWINGS

FIGS. 8($a$–$c$) is a plot showing a deposited solid yield and a water-soluble oligosaccharide.glucose yield against a cellulose disappearance ratio.

DESCRIPTION OF PREFERRED EMBODIMENTS

A preferred embodiment of the present invention will be described with reference to the drawings.

Figure 4:
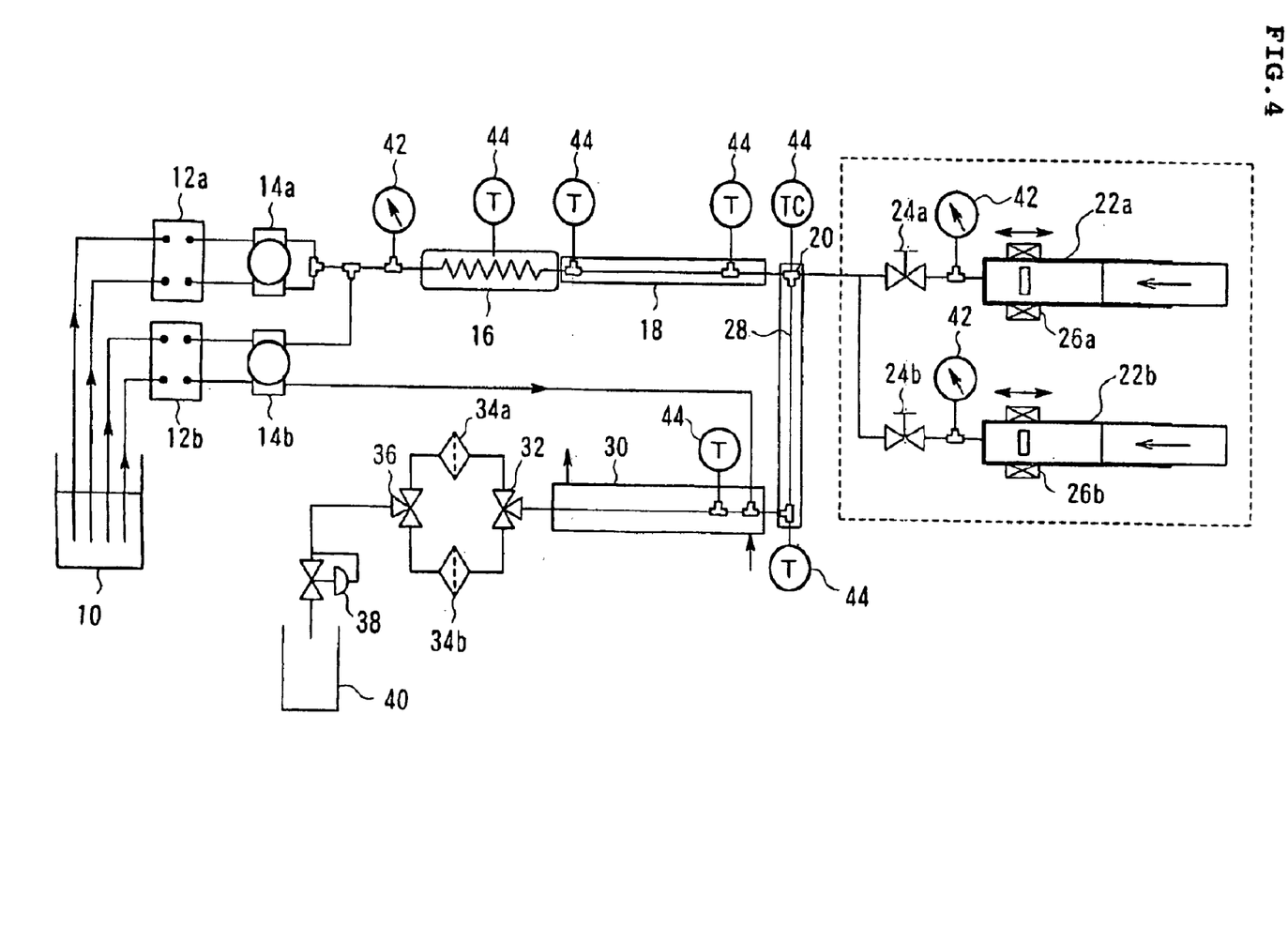
FIG. 4 is a diagram showing an exemplary configuration of devices for practicing a method according to one embodiment of the present invention.

FIG. 4 shows an exemplary configuration of devices for practicing a method according to an embodiment of the present invention. A distilled water reservoir 10 reserves distilled water. To the distilled water reservoir 10, inlets of high pressure feed pumps 14$a$ and 14$b$ are connected via degassing units 12$a$ and 12$b$, respectively. The high pressure feed pumps 14$a$ and 14$b$ each have two outlets from which they discharge distilled water at high pressures. The two outlets of the high pressure feed pump 14$a$ and one of the outlets of the high pressure feed pump 14$b$ are connected to a first heater 16. The first heater 16 comprises an electric furnace and heats distilled water passing through meandering piping installed therein. To the first heater 16, a second heater 18 for further heating of distilled water discharged from the first heater 16 is connected. The second heater 18 has straight piping inside. An outlet of the second heater 18 is connected to one inlet of a junction unit 20, and high-pressure hot water heated to a given high temperature by the second heater 18 is fed to the junction unit 20.

Meanwhile, to the other inlet of the junction unit 20, two slurry feed pumps 22$a$ and 22$b$ are connected via valves 24$a$ and 24$b$, respectively. The slurry feed pumps 22$a$ and 22$b$ each have a cylinder and a piston and extrude the slurry introduced into the cylinder at a given pressure by movement of the pistons. Further, the slurry feed pumps 22$a$ and 22$b$ are driven alternately, and either one of the valves 24$a$ and 24$b$ which is connected to one to be driven is opened.

The Cellulose-water slurry to be introduced into the slurry feed pumps 22$a$ and 22$b$ is a mixture of distilled water and a predetermined amount of type I cellulose. In the slurry feed pumps 22$a$ and 22$b$, reciprocating magnetic stirrers 26$a$ and 26$b$ are installed. The reciprocating magnetic stirrers 26$a$ and 26$b$ are driven to prevent precipitation of the slurry in the pumps 22$a$ and 22$b$ and maintain a mixed state of the slurry.

As described above, high-temperature/high-pressure hot water discharged from the second heater 18 and the cellulose-water slurry discharged from the slurry feed pumps 22$a$ and 22$b$ are fed into the junction unit 20 and merged at the junction unit 20. An outlet of the junction unit 20 is connected to an inlet of a reaction tube 28. A mixture of the hot water and the slurry merged at the junction unit 20 is charged into the reaction tube 28.

The reaction tube 28 is formed by a pipe having a given length. When the mixture of the hot water and the slurry passes through the pipe, a reaction at high temperatures and high pressures occurs. The reaction in the reaction tube 28 causes cellulose to dissolve, thereby creating a cellulose solution as a reaction solution.

To an outlet of the reaction tube 28, a cooler 30 is connected. This cooler 30 comprises a heat exchanger which circulates cooling water around piping through which the cellulose solution discharged from the reaction tube 28 flows, and the reaction solution from the reaction tube 28 is cooled when circulated through the cooler 30. Further, to the cooler 30, one of the outlets of the high pressure feed pump 14$b$ is connected. Thus, room-temperature distilled water (cooling water) from the high pressure feed pump 14$b$ is mixed into the reaction solution from the reaction tube 28. Thereby, a quick decrease in the temperature of the high-temperature reaction solution can be realized.

To an outlet of the cooler 30, two inline filters 34$a$ and 34$b$ are connected via a three-way valve 32. A reaction solution filtered by these inline filters 34$a$ and 34$b$ is fed to a back-pressure adjusting valve 38 via a three-way valve 36. At an outlet of the back-pressure adjusting valve 38, a sample reservoir 40 is disposed. Therefore, a cooled reaction solution flown out of the cooler 30 is filtered through either one of the inline filters 34$a$ and 34$b$, and the filtered reaction solution is stored in the sample reservoir 40.

Then, the aperture of the back-pressure adjusting valve 38 is adjusted so as to adjust the pressure between the high pressure feed pumps 14a and 14b and the back-pressure adjusting valve 38 to a predetermined high pressure.

Further, this system also has pressure meters 42 for measuring a pressure at the inlet of the first heater 16 and pressures at the outlets of the slurry pumps 22a and 22b, and thermometers 44 for measuring the temperature inside the first heater 16, the temperatures at the inlet and outlet of the second heater 18, the temperatures at the inlet and outlet of the reaction tube 28, and the temperature inside the cooler 30. The results of measurements made by these meters are provided to a control unit (not shown) comprising a microcomputer or the like. Then, the control unit controls the heaters 16 and 18 and the cooler 30 based on these measurement results so as to control the temperature of a reaction solution in the reaction tube 28. It is also preferable that the control unit also controls flow rates of the high pressure feed pumps 14a and 14b and of the slurry feed pumps 22a and 22b.

In such a system, the cellulose-water slurry is charged into the slurry pumps 22a and 22b and stirred to a sufficient extent by means of the magnetic stirrers 26a and 26b. For example, the slurry is stirred for about 30 to 60 minutes. The resulting cellulose-water slurry is sent to the junction unit 20 by the slurry pumps 22a and 22b at a predetermined flow rate (for example, 6Q), while heated water is also sent to the junction unit 20 at a predetermined flow rate (for example, 12Q). Thereby, the slurry and the hot water are mixed together at the junction unit 20 to create a hot mixed slurry having a flow rate of 18Q. By such mixing, the temperature of cellulose in the cellulose-water slurry is increased instantaneously, and the cellulose will be in a high temperature state.

The flow rate and temperature of the heated water are adjusted so as to maintain the internal temperature of the reaction tube 28 at 370 to 400° C., and the back-pressure adjusting valve 38 is adjusted to maintain a pressure of 25 to 33 MPa. Thereby, in the reaction tube 28, water is kept in a supercritical state or in a subcritical state. The temperature of the reaction tube 28 may be determined by an enthalpy balance of an influent substance into the reaction tube 28 in place of the thermoelectric thermometers (TC) 44. The exposure time in the reaction tube 28 should be short, on the order of about 0.02 to 0.60 seconds. The exposure time is determined according to the degree of polymerization of a type II cellulose desired to be obtained in the end. For example, the exposure time in the reaction tube 28 can be adjusted to any value by changing the volume of the reaction tube 28 and/or the flow rate of the influent substance.

Further, in the cooler 30 connected to the outlet of the reaction tube 28, the reaction solution is not only cooled by heat exchange but also mixed with room-temperature distilled water (cold water). For example, the amount of distilled water to be mixed is assumed to be 10Q. Together with heat exchange in the cooler 30, the temperature of the reaction solution discharged from the reactor 28 drops sharply to about 60° C. Particularly, a definite temperature drop can be caused according to the amount of distilled water to be mixed.

As described above, according to the device used in conjunction with the present embodiment, a slurry is heated rapidly by mixing with hot water and cooled rapidly by mixing with cold water. Therefore, an exposure time, i.e., a reaction time or the time the mixture is allowed to remain in the reaction tube 28, can be accurately controlled to a predetermined, short time.

When the volume of the reaction tube 28 is V, a mass flow at room temperature is F and a density of water at a reaction temperature and a reaction pressure is ρ(T, P), a slurry exposure time τ in the reaction tube 28 can be calculated from the following expression.

$$\tau = V \cdot \rho(T, P)/F$$

Thus, the slurry containing a type I cellulose is introduced into the reaction tube 28 and mixed with hot water, thereby becoming a supercritical state or a subcritical state rapidly. Then, after maintained in this state for a predetermined reaction time, the slurry is cooled rapidly so as to restore the slurry in the supercritical state or subcritical state to normal state (room temperature and atmospheric pressure).

Then, an undissolved cellulose is separated by the inline filters 34, and a sample having a cellulose dissolved therein is stored in the sample reservoir 40.

Thus, solids separated by the inline filters 34 are obtained along with the sample. When the sample is left to stand for 2 hours to 2 days at room temperature, a white deposit (deposited solid) appears. In the present embodiment, this deposited solid is separated by filtration and collected. This deposited solid is a target type II cellulose. Cooling the sample to a temperature lower than room temperature is also suitable.

Thus, in the present embodiment, a cellulose is dissolved in water in a supercritical state or subcritical state which is used as a solvent in the reaction tube 28, and the reaction solution is then allowed to return to room temperature or lower at atmospheric pressure. Thereby, the dissolved cellulose is deposited as crystals, and a type II cellulose is obtained.

Figure 5:
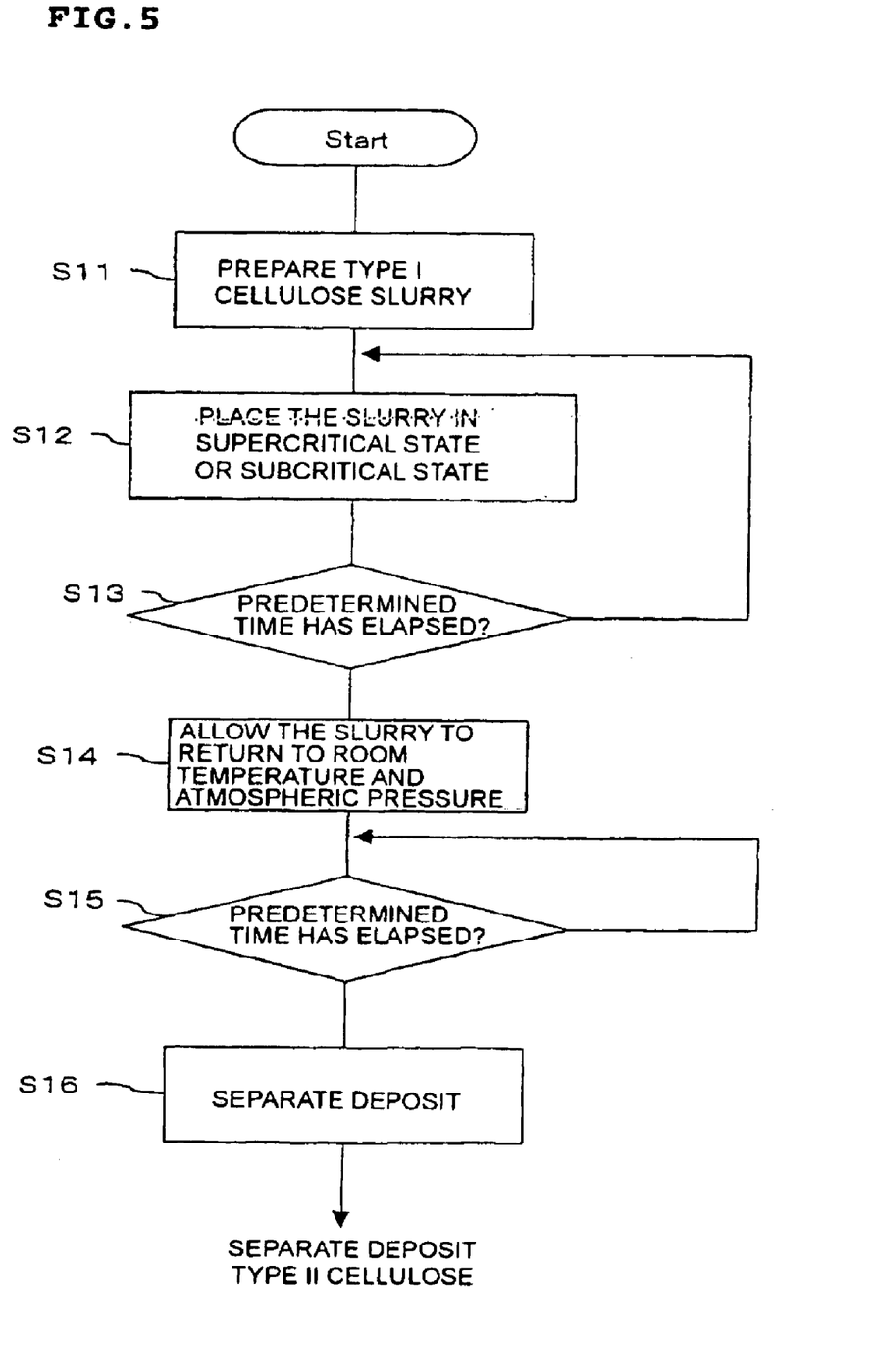
FIG. 5 is a flowchart of the method of the embodiment.

Next, a method for forming a type II cellulose according to the present embodiment will be described with reference to FIG. 5. First, microcrystals of a type I cellulose are mixed with distilled water at a proper concentration to prepare a slurry (S11).

This slurry is kept in a supercritical state or subcritical state (S12) until a predetermined amount of time has passed, by determining whether the predetermined time has passed (S13). Thereby, hydrogen bonds of the cellulose are decomposed by water in a supercritical state or subcritical state and the cellulose is dissolved in the water.

The reaction time is determined according to the degree of polymerization and/or crystallinity index of a type II cellulose desired to be formed. Further, since the reaction time is generally short, on the order of 1 second at most, the slurry must be heated rapidly and then cooled rapidly after highly pressurized. To do so, a continuous processing system as described above is suitable, but the present invention is not limited to such a system and may be, for example, a batch processing system. Furthermore, it is also acceptable that hot water is passed through a reaction tube containing relatively large particles of a type I cellulose so as to dissolve predetermined amounts of cellulose.

Then, the slurry is cooled to lower its temperature, freed from a pressurized state, and allowed to return to room temperature and atmospheric pressure (S14). As described above, in a short reaction, while hydrogen bonds of a cellulose are decomposed, the reaction is stopped before hydrolysis proceeds to a sufficient degree. Therefore, a solution having a cellulose which has a certain degree of polymerization and which should be insoluble at room temperature and atmospheric pressure dissolved therein can be obtained.

Then, the cellulose solution is maintained at room temperature or lower at atmospheric pressure for a predetermined time (S15). Thereby, a white deposit is produced. Then, the deposit is separated by filtration or other means.

As a result of analysis, it was found that the separated solid is a type II cellulose. As described above, in the system of the present embodiment, a cellulose is caused to be in contact with water in a supercritical state or subcritical state in the reaction tube 28 for a predetermined length of time. Then, the reaction processed solution is kept at room temperature and atmospheric pressure, thereby depositing a type II cellulose. Then, the deposited solid is separated to give a type II cellulose.

Particularly, when the exposure time (reaction time) in the reaction tube 28 is extended with the temperature and the pressure fixed, the obtained type II cellulose has a smaller degree of polymerization and a lower crystallinity index. When the reaction time is shortened, the obtained type II cellulose has a larger degree of polymerization and a higher crystallinity index. Thus, a type II cellulose having any degree of polymerization and/or crystallinity index can be obtained by control of the reaction time. Further, the higher the temperature and pressure in the reaction, the further dissolution and hydrolysis of an type I cellulose proceed. Therefore, when the reaction time is extended at a high temperature and a high pressure, the cellulose is hydrolyzed into oligosaccharide or glucose, thereby decreasing the yield of the type II cellulose. Meanwhile, as the temperature and the pressure are relatively decreased, hydrolysis of the cellulose does not proceed easily.

Next, formation of a type II cellulose according to the present embodiment will be considered. First, a slurry containing a type I cellulose as a raw material is brought into contact with water in a supercritical state or subcritical state in the reaction tube 28. Thereby, the type I cellulose is rapidly swollen and dissolved in the supercritical or subcritical water as a solvent. It is considered that this is because a portion of the hydrogen bonds in crystals of the cellulose are decomposed and the cellulose is thereby changed into a water-soluble form.

A state of the heated slurry in a supercritical state or subcritical state has been observed by use of a diamond anvil which is a hermetically sealed reaction chamber both sides of which are formed of diamonds. As a result, it has been found that a cellulose dissolves instantaneously when the slurry reaches a predetermined supercritical or subcritical state temperature. It is also inferred from this that a cellulose does not react gradually from its surface but that hydrogen bonds of the cellulose are at least partially cleaved when the slurry becomes a predetermined state and the cellulose dissolves.

Then, when the cellulose dissolves in the water in a supercritical state or subcritical state as described above, a hydrolysis reaction proceeds. If the reaction time is long, hydrolysis proceeds to the extent that most of the cellulose is decomposed into oligosaccharide or glucose, so that a solid of a type II cellulose cannot be obtained.

However, if the reaction time is short, the hydrolysis reaction stops before the hydrolysis proceeds sufficiently. It is considered than when the reaction solution is allowed to return to room temperature and atmospheric pressure, the cellulose which is not sufficiently hydrolyzed is crystallized in water and deposited as a type II cellulose. It is considered that the type II cellulose is obtained because the type II cellulose is more stable in terms of energy than the type I cellulose, but is formed in the reaction in water.

Further, as described above, the degree of hydrolysis is determined according to reaction time. As the reaction time becomes shorter, a type II cellulose having a higher molecular weight and a higher degree of polymerization is obtained, while as the reaction becomes longer, a type II cellulose having a lower molecular weight and a lower degree of polymerization is obtained. Consequently, the degree of polymerization can be controlled by control of the reaction time so as to obtain any desired type II cellulose. Further, a cellulose has a structure comprising crystal portions and amorphous portions linked together. The proportion of the crystal portions is a crystallinity index, which can be controlled by control of a reaction time. The crystallinity index is apt to decrease along with a decrease in the degree of polymerization. Thus, a cellulose suitable for a variety of applications can be obtained.

In addition, in this reaction, water alone is mixed with the type I cellulose as a raw material, and other chemical substances, such as an acid, are not needed. Therefore, a type II cellulose of high purity can be obtained. Consequently, the type II cellulose is not harmful to the human body and its use in a wide variety of applications can be contemplated.

For example, a type II cellulose can be used as a raw material for clothing. A long fiber type I cellulose is excellent in moisture absorbability and durability and used as a cotton fiber or the like. Meanwhile, a short fiber such as a cupra or rayon is excellent in gloss, texture, dyeing characteristics, and stretchability. Type II celluloses obtained in the present embodiment have different crystallinities and their degrees of polymerization can be controlled. Therefore, it is expected that raw materials for clothing which have a variety of properties can be obtained.

Further, the produced fibers can also be used as dietary fibers. The type I cellulose is applied to food as a dietary fiber as in a food additive and a fiber wafer by use of its biological functions including low digestibility and high moisture absorbability. The type II cellulose can also be used in the same application. Further, as a drug, it can also be used as a filler for tablets (for regulating time for passage through the digestive tract) and an antiflatuent (for assisting in discharge of toxic substances from the digestive tract). In addition, it is also known that oligosaccharides such as xylooligosaccharide, soybean oligosaccharide and fructo-oligosaccharide have a function of controlling intestinal functions. Because the type II celluloses obtained in the present embodiment differ in crystallinity and because their degrees of crystallinity can be controlled, they can be used for dietary fibers and drugs with a variety of properties. Further, it has been reported that a cellulose has possibilities such as a function of controlling an increase in blood sugar and a function of improving serum lipid. It is expected to use a cellulose in a variety of functional foods and drugs by controlling its degree of polymerization and/or crystallinity index.

EXAMPLES

Hereinafter, the results of a process which has been actually performed by means of the system shown in FIG. 4 will be described. In this experiment, the volumes of the slurry pumps 22a and 22b each were 300 cm$^3$, an SUS316 stainless tube (external diameter: ⅛ inches) was used as the reaction tube 28, and the volume of the reaction tube 28 was varied from 0.03 to 5.27 cm$^3$ by replacing the reaction tube 28. Further, the concentration and flow rate of a cellulose-water slurry filled in the slurry pumps 22a and 22b were set to be 10 wt % and 6.0 g/min, respectively. Meanwhile, the flow rate of high-temperature hot water fed into the reaction tube 28 was set to be 12.0 g/min. The reaction temperature and pressure within the reaction tube 28 were set to be 370 to 400° C. and 25 to 33 MPa, respectively. Further, a reaction solution discharged from the reaction tube 28 was cooled in the cooler 30 rapidly to 60° C.

A residual cellulose separated by the inline filters 34a and 34b and a deposited solid and a water-soluble product which were separated from the obtained sample by filtration were analyzed.

After drying, the solid obtained by the inline filters 34a and 34b was subjected to weight measurement, infrared spectrum (FTIR) measurement, and X-ray diffraction (XRD) measurement. Thereby, it was confirmed that the solid was a cellulose, and a cellulose disappearance ratio was calculated. Further, from the X-ray diffraction (XRD) measurement of the solid (residual cellulose), a crystal structure was evaluated and a crystallinity index was determined. In addition, the viscosity average degree of polymerization of the solid (residual cellulose) was calculated from viscosity measurements.

As for the water-soluble product which is a filtrate of the sample, identification and quantification of the product such as a saccharide are performed by high performance liquid chromatography (HPLC), the amount of organic acids was determined by pH measurement, and the selectivity of the water-soluble product was determined from a total organic carbon (TOC) measurement.

As for the deposited solid, weight, FTIR, XRD, and degree of polymerization (DP) were measured, and the yields of a type II cellulose and the like were calculated.

"Water-Soluble Product"

As the water-soluble product, an oligomer saccharide which is a hydrolyzed cellulose, glucose, and an organic acid comprising formic acid and acetic acid as main components were detected. It was understood from results of processes performed under a variety of conditions that a hydrolysate was recovered with high efficiency at a temperature of 400° C. and a pressure of 25 MPa and with an exposure time of 0.02 to 0.05 seconds or at a temperature of 380° C. and a pressure of 30 MPa and with an exposure time of 0.16 to 0.29 seconds.

"Crystal Structure of Residual Cellulose"

XRD measurement was conducted on a residual cellulose recovered by treatment with supercritical or subcritical water which was carried out at a temperature of 320 to 380° C. and a pressure of 25 to 33 MPa and with an exposure time of 0.16 to 9.9 seconds.

Thereby, it was confirmed that in a low temperature range (290° C. and 320° C.), the crystal structure of the residual cellulose did not change significantly from the type I cellulose structure of a microcrystalline cellulose, even if the reaction proceeded. Meanwhile, a residual cellulose recovered from an experiment conducted at a temperature of 355 to 380° C. and a pressure of 25 to 33 MPa contains a type II cellulose in addition to a type I cellulose, and it was confirmed that the higher the disappearance ratio of the cellulose, the higher diffraction peak intensity derived from a type II structure.

"Crystal Structure of Deposited Solid"

A deposit was produced in the sample in the reaction tube at a temperature of 355 to 400° C. (particularly 370 to 400° C.) and a pressure of 25 to 33 MPa and with an exposure time of 0.05 to 0.35 seconds. The deposit was separated by filtration and dried, and its molecular structure was then evaluated by FTIR measurement.

Figure 6:
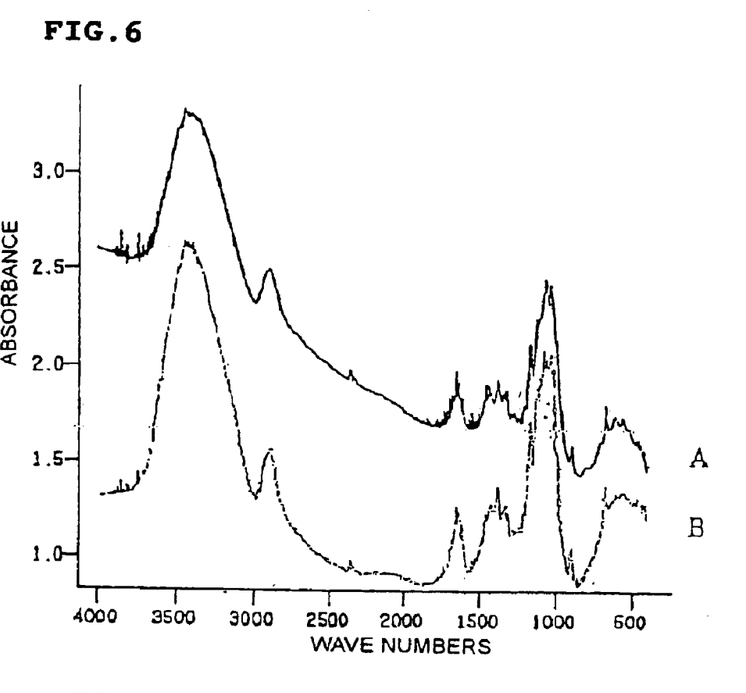
FIG. 6 is a diagram showing the results of FTIR measurements on a microcrystalline cellulose (A) as a raw material and a deposited solid (B).

FIG. 6 shows the results of FTIR measurements conducted on a microcrystalline cellulose (A) as a raw material and a deposited solid (B) obtained at a temperature of 400° C. and a pressure of 25 MPa and with an exposure time of 0.16 seconds. The horizontal axis represents wave numbers, and the vertical axis represents absorbance. Thereby, it is understood that the deposited solid has a cellulose molecular structure as in the case of the microcrystalline cellulose. Further, the deposited solid was put in a dilute sulfuric acid aqueous solution (4.0 volt) and hydrolyzed in an oil bath at 120° C. for 150 minutes. Thereafter, calcium carbonate was added thereto to neutralize the reaction solution, and HPLC measurement was then carried out. As a result, it was determined that only glucose was obtained as a product, and it was thereby confirmed that the deposited solid was a cellulose.

Figure 7:
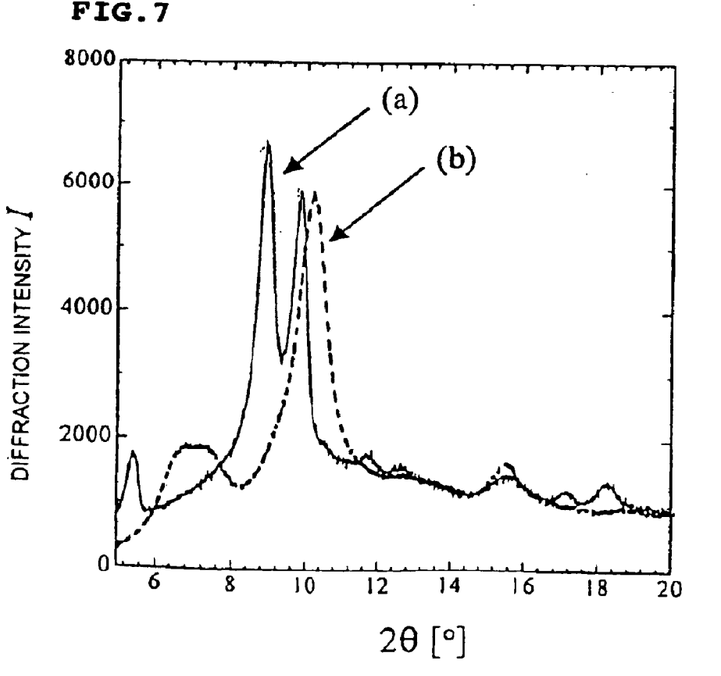
FIG. 7 is a diagram showing the result of XRD measurement on the deposited solid.

Further, XRD measurement was conducted on the deposited solid, and its crystal structure was evaluated. The result is shown in FIG. 7. The horizontal axis represents a diffraction angle (2θ), and the vertical axis represents diffraction intensity (I). It can thereby be seen that the X-ray pattern of the deposited solid is completely different pattern from that of the microcrystalline cellulose (I-type cellulose) used as a raw material. Further, the X-ray diffraction patterns of all deposited solids obtained in the present experiment are also completely different from that of the microcrystalline cellulose. This X-ray diffraction pattern is a pattern peculiar to a type II cellulose formed by dissolution and rearrangement of the microcrystalline cellulose (I-type cellulose). This indicates that the cellulose is dissolved in water which is near a critical temperature. When the crystallinity index, crystal length ($D_{2,0,0}$) in a fiber direction ((2,0,0) plane) and viscosity average DP of the deposited solid were measured, it was confirmed that the recovered deposited solid was a highly crystalline type II cellulose having an average DP of 40 to 50 and a crystallinity index of 60 to 80%.

The crystallinity index (Cr.) of each of the celluloses was determined from peak intensity $I_{2,0,0}$ of X-ray diffraction corresponding to the (2,0,0) plane (2θ=9.98° in the case of the type I cellulose and 2θ=9.00° in the case of the type II cellulose) of each cellulose and intensity $I_{am}$ (2θ=8.40° in the case of the type I cellulose and 2θ=6.00° in the case of the type II cellulose) of X-ray diffraction corresponding to an amorphous portion by use of the following expression.

$$Cr.=(I_{2,0,0}-I_{am})/I_{2,0,0}$$

"Conditions for Forming Deposited Solid"

Figure 8:
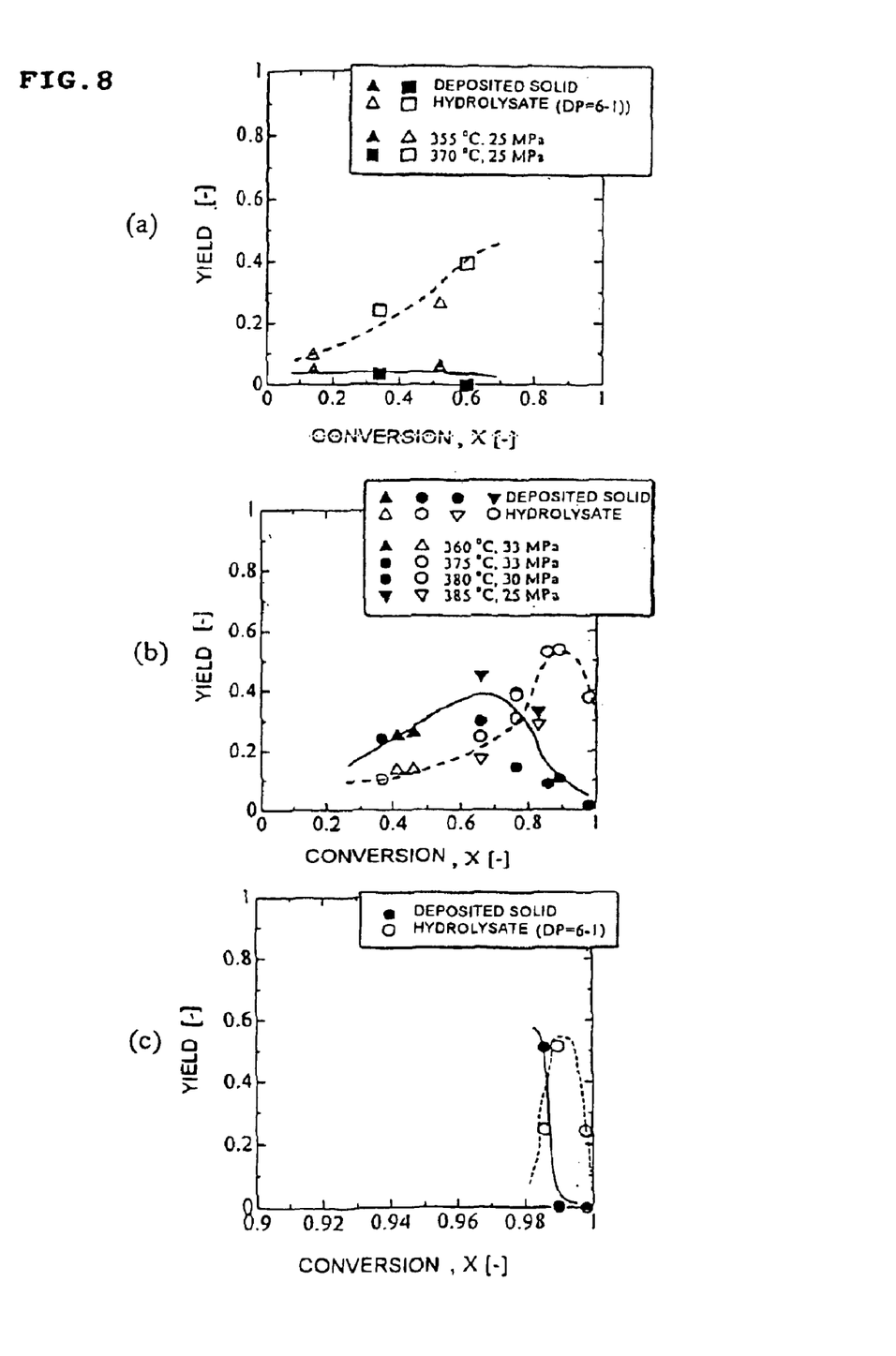

The yield of a deposited solid and the yield of a water-soluble oligosaccharide-glucose under various reaction conditions were determined from the weight of the deposited solid. FIGS. 8(a), 8(b), and 8(c) show plots of yields of deposited solids and the yields of water-soluble oligosaccharide•glucoses against cellulose disappearance ratios (Conversion, X).

At temperatures of 355° C. and 370° C. and a pressure of 25 MPa (FIG. 8(a)), the yield of a water-soluble oligosaccharide-glucose was increased as the reaction proceeded but the yield of a deposited solid was as low as 3 to 5%. On the other hand, at a temperature close to a critical temperature and a high pressure as shown in FIG. 8(b), the yield of a deposited solid and the yield of a water-soluble oligosaccharide•glucose were high. Further, at a high temperature of 400° C. and a pressure of 25 MPa (FIG. 8(c)), the same tendency was seen.

"Influence of Exposure Time"

Figure 9:
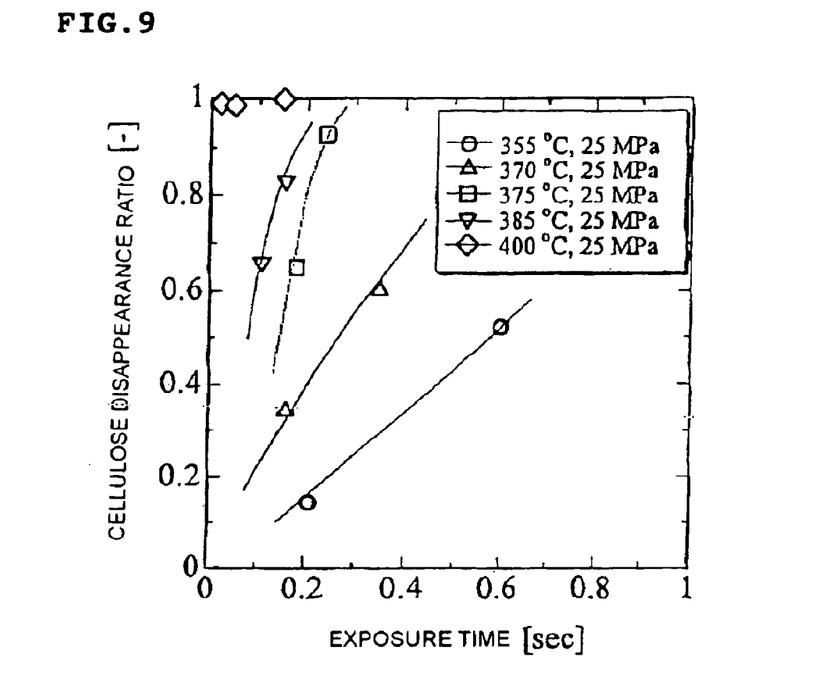
FIG. 9 is a diagram showing the relationship between a cellulose disappearance ratio and an exposure time (reaction time) under a pressure of 25 MPa.

FIG. 9 shows the relationship between a cellulose disappearance ratio and an exposure time under a pressure of 25 MPa. At all temperatures, longer exposure times correlate with higher cellulose disappearance ratios. Further, the higher the temperature, the higher is the cellulose disappearance ratio.

Figure 10:
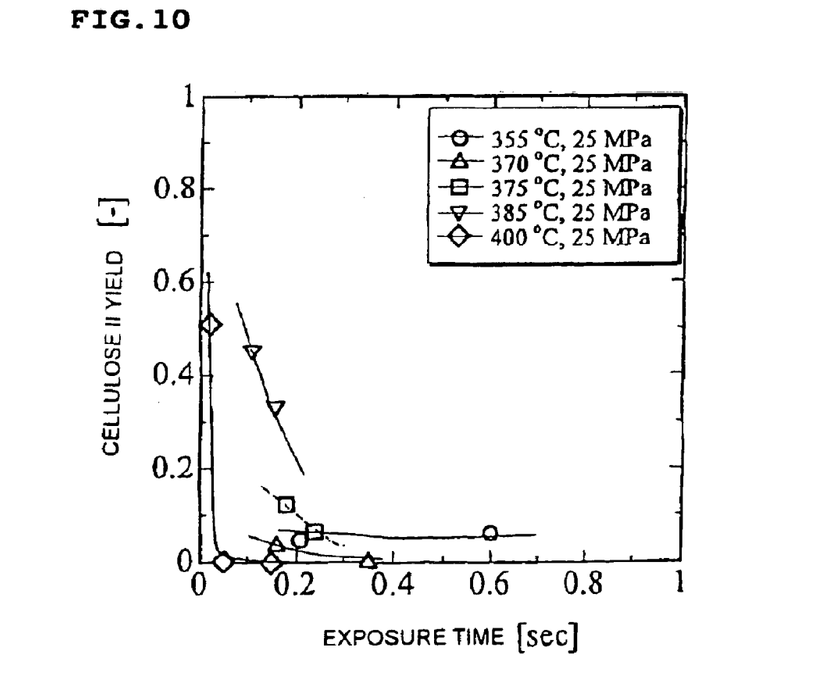
FIG. 10 is a diagram showing the relationship between a type II cellulose yield and an exposure time under a pressure of 25 MPa.

FIG. 10 shows the relationship between a type II cellulose yield and an exposure time under a pressure of 25 MPa. It can be understood from FIG. 10 that the temperature is advantageously high and the exposure time is advantageously short in order to increase the cellulose II yield. For example, a relatively high yield of 0.5 can be obtained at 400° C. and with 0.06 seconds. Further, a relatively high yield of about 0.45 can be obtained at 385° C. and with 0.1 seconds. When the temperature is 400° C. and the exposure time is about 0.5 seconds, the yield becomes 0, while when the temperature is 385° C. and the exposure time is 0.15 seconds, a yield of about 0.33 can still be obtained. Thus, in consideration of ease of control, reaction conditions comprising a temperature of 385° C., a pressure of 25 MPa, and an exposure time of about 0.1 seconds can be said to be preferable.

Figure 11:
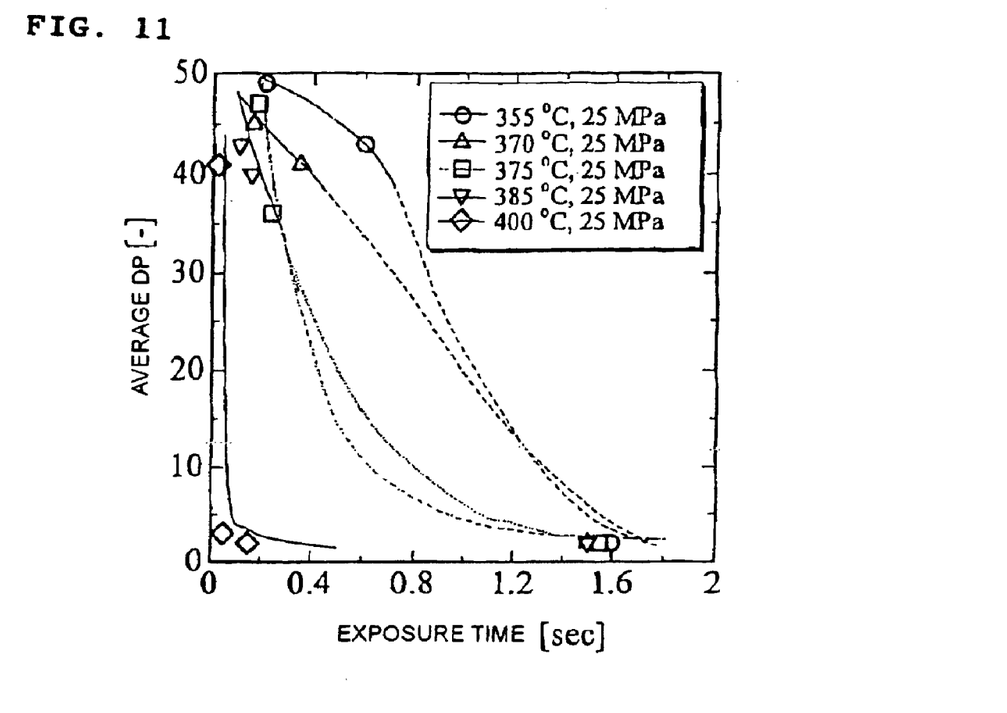
FIG. 11 is a diagram showing the relationship between a viscosity average polymerization degree of a type II cellulose and as exposure time under a pressure of 25 MPa.

FIG. 11 shows the relationship between a viscosity average DP of a type II cellulose and an exposure time under a pressure of 25 MPa. As can be seen from FIG. 11, the degree of polymerization is greatly influenced by an exposure time and a temperature. It can understood from FIG. 11 that a type II cellulose having a desired degree of polymerization can be obtained by setting the temperature and the exposure time at appropriate values.

Figure 12:
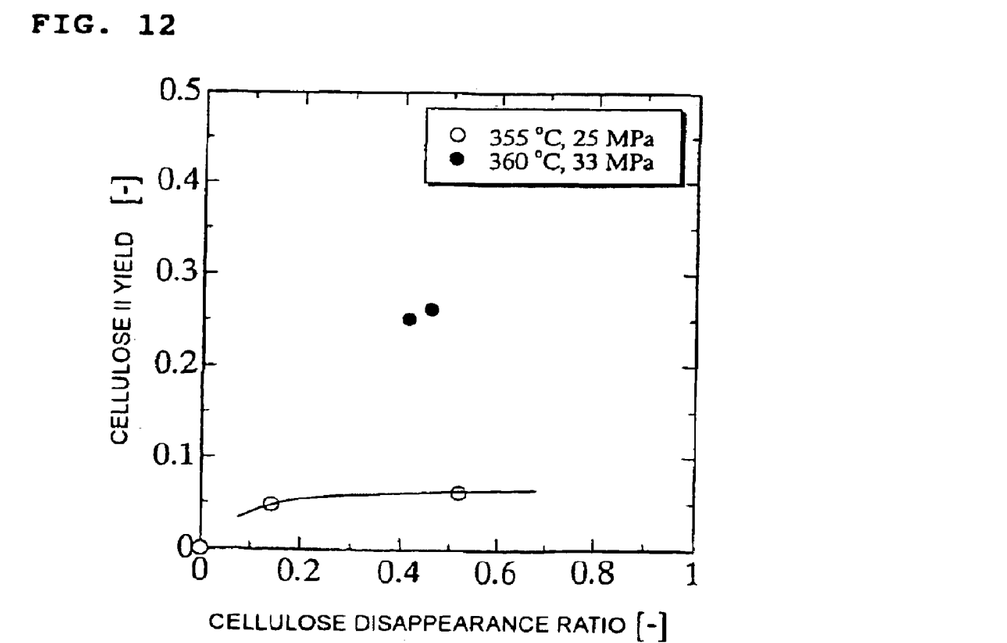
FIG. 12 is a diagram showing the relationship between a type II cellulose yield and a cellulose disappearance ratio at temperatures ranging from 355 to 360° C.

FIG. 12 shows the effect of pressure on type II cellulose yield at temperatures of 355 to 360° C. The horizontal axis represents a cellulose disappearance ratio. The longer the exposure time, the higher the cellulose disappearance ratio. As can be seen from FIG. 12, at these temperatures, the yield increases as the pressure is increased.

Figure 13:
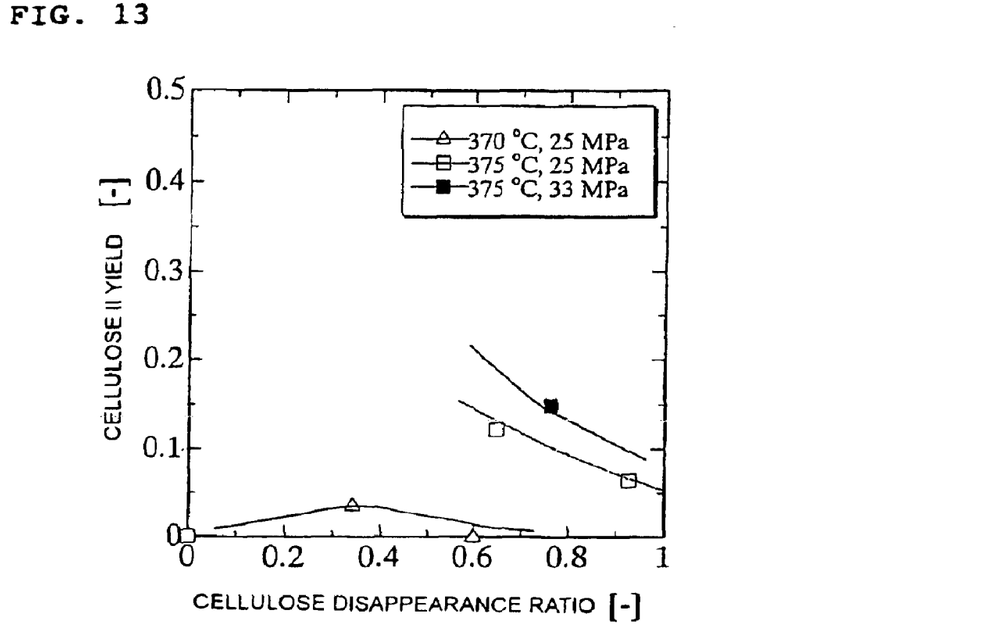
FIG. 13 is a diagram showing the relationship between a type II cellulose yield and a cellulose disappearance ratio at temperatures ranging from 380 to 385° C.

FIG. 13 shows the effect of a pressure on cellulose II yield at temperatures of 380 to 385° C. The horizontal axis represents a cellulose disappearance ratio. As can be seen from FIG. 13, at these temperatures as well, the yield increases as the pressure is increased, but the difference is smaller. It can be understood from FIG. 13 that growth of a type II cellulose can be controlled by three factors, i.e., exposure time, temperature, and pressure.

Figure 14:
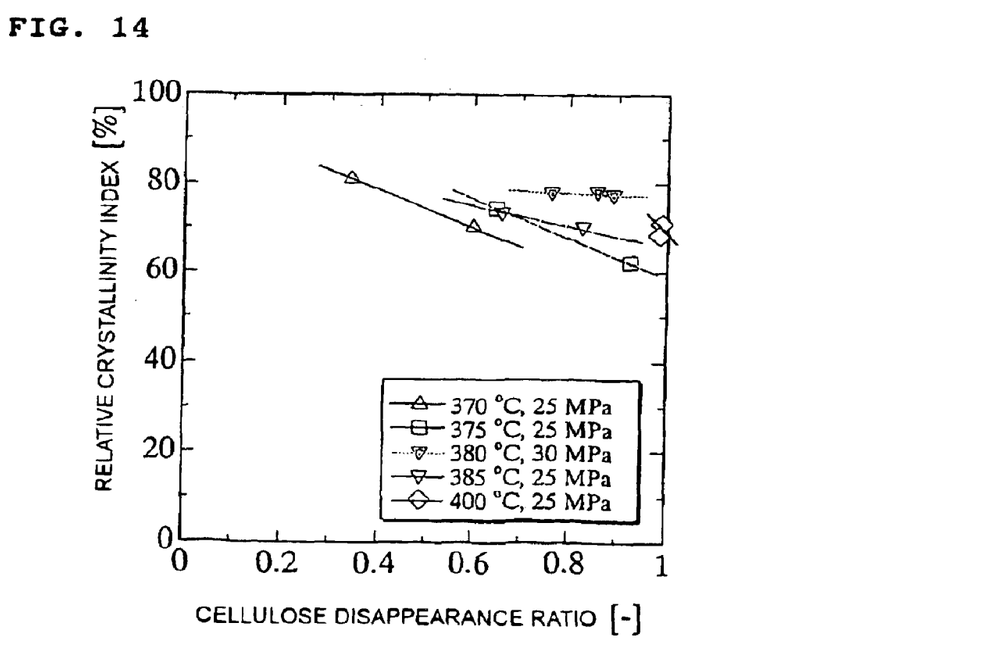
FIG. 14 is a diagram showing the relationship between the cellulose disappearance ratio and the relative crystallinity index of a type II cellulose.

FIG. 14 shows the relationship between a relative crystallinity index (Cr.) and cellulose disappearance ratio of a type I cellulose at temperatures of 370 to 400° C. The horizontal axis represents the cellulose disappearance ratio, and the vertical axis represents the relative crystallinity index. As can be understood from FIG. 14, there is a tendency that, as the cellulose disappearance ratio becomes higher, a type II cellulose having a lower crystallinity index is obtained.

It was confirmed from these results that a type II cellulose can be obtained by bringing a type I cellulose into contact with water in a supercritical state or subcritical state at a temperature of 350 to 400° C. and a pressure of 25 to 33 MPa and allowing the mixture to react for about 0.002 to 1.5 seconds to dissolve the type I cellulose in the water, and then allowing the resulting mixture to return to room temperature and atmospheric pressure.

A type II cellulose obtained in the present invention can be used as a dietary fiber or a drug. In particular, it has been reported that the cellulose has possibilities such as a function of controlling an increase in blood sugar and a function of improving serum lipid. It is expected celluloses usable in a variety of functional foods and drugs will be prodcued by appropriately controlling the degree of polymerization and/or the crystallinity index.

What is claimed is:

1. A method for forming a cellulose, comprising the steps of cleaving hydrogen bonds in a type I cellulose in a solvent of water in a supercritical state or water in a subcritical state and at a temperature of 350 to 400° C. and a pressure of 25 to 33 MPa such that the type I cellulose is dissolved in the water in a supercritical state or the water in a subcritical state, and then allowing the resulting solution to return to room temperature or lower at atmospheric pressure to obtain a type II cellulose having a lower polymerization degree than the type I cellulose.

2. A method for forming a type II cellulose, comprising the steps of:

simultaneously charging into a tubular reactor a slurry comprising a type I cellulose dispersed in water and water in a supercritical state or in a subcritical state and at a temperature of 350 to 400° C. and a pressure of 25 to 33 MPa, allowing the type I cellulose and the hot water to contact each other in the reaction tube for a predetermined length of time, thereby cleaving hydrogen bonds in the type I cellulose and dissolving the type I cellulose in the water in a supercritical state or subcritical state, cooling the cellulose solution discharged from the reaction tube to room temperature or lower at atmospheric pressure to deposit crystals of a type II cellulose having a polymerization degree lower than that of the type I cellulose, and separating the type II cellulose from the solvent.

3. A method for forming a cellulose, comprising the steps of:

bringing a type I cellulose into contact with water in a supercritical state or water in a subcritical state and at a temperature of 350 to 400° C. and a pressure of 25 to 33 MPa for a predetermined length of time to cleave hydrogen bonds in the type I cellulose and dissolve the type I cellulose in the water, and allowing the cellulose solution to return to room temperature or lower at atmospheric pressure to obtain a type II cellulose having a degree of polymerization than lower that of the type I cellulose, and controlling the length of time during which the type I cellulose is brought into contact with the water and the temperature and the pressure during the contact to control at least one of a polymerization degree and a crystallinity index of the produced type II cellulose.

4. The method of claim 3, wherein the type I cellulose is mixed with the water in a supercritical or subcritical state to rapidly raise the temperature of the mixture, and the mixture is then mixed with cold water to rapidly lower the temperature of the mixture, thereby controlling the length of time during which the type I cellulose is brought into contact with the water in the supercritical or subcritical state.

5. The method of claim 1, further comprising the step of removing solid particles from the solution by filtration, wherein the step of removing solid particles is conducted after the step of cleaving hydrogen bonds in a type I cellulose in a solvent of water in a supercritical state or water in a subcritical state and before the step of allowing the resulting solution to return to room temperature or lower at atmospheric pressure.

6. The method of claim 2, further comprising the step of removing solid particles from the solution by filtration, wherein the step of removing solid particles is conducted after the step of allowing the type I cellulose and the hot water to contact each other in the reaction tube for a predetermined length of time and before the step of cooling the cellulose solution discharged from the reaction tube to room temperature or lower at atmospheric pressure.

7. The method of claim 3, further comprising the step of removing solid particles from the solution by filtration, wherein the step of removing solid particles is conducted after the step of bringing a type I cellulose into contact with water and before the step of allowing the cellulose solution to return to room temperature or lower at atmospheric pressure.

8. The method of claim 4, further comprising the step of removing solid particles from the solution by filtration, wherein the step of removing solid particles is conducted after the step of bringing a type I cellulose into contact with water and before the step of allowing the cellulose solution to return to room temperature or lower at atmospheric pressure.

* * * * *